US011585265B2

(12) United States Patent
Fujita et al.

(10) Patent No.: US 11,585,265 B2
(45) Date of Patent: Feb. 21, 2023

(54) SURGE SUPPRESSION DEVICE, EXHAUST TURBINE TYPE TURBOCHARGER AND SURGE SUPPRESSION METHOD

(71) Applicant: MITSUBISHI HEAVY INDUSTRIES ENGINE & TURBOCHARGER, LTD., Sagamihara (JP)

(72) Inventors: Yutaka Fujita, Tokyo (JP); Nobuhito Oka, Sagamihara (JP); Makoto Ozaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/432,617

(22) PCT Filed: Mar. 14, 2019

(86) PCT No.: PCT/JP2019/010555
§ 371 (c)(1),
(2) Date: Aug. 20, 2021

(87) PCT Pub. No.: WO2020/183703
PCT Pub. Date: Sep. 17, 2020

(65) Prior Publication Data
US 2022/0136464 A1 May 5, 2022

(51) Int. Cl.
F02B 37/18 (2006.01)
F02M 26/06 (2016.01)
(Continued)

(52) U.S. Cl.
CPC .............. F02B 37/18 (2013.01); F02M 26/06 (2016.02); F02M 26/37 (2016.02); F02B 2037/125 (2013.01)

(58) Field of Classification Search
CPC ... F02B 2037/125; F02B 37/18; F02M 26/06; F02M 26/37
See application file for complete search history.

(56) References Cited

U.S. PATENT DOCUMENTS

2009/0308364 A1* 12/2009 Konohara .............. F02M 25/06
123/568.11
2012/0247438 A1* 10/2012 Konohara ............ F01M 13/022
123/574

(Continued)

FOREIGN PATENT DOCUMENTS

CN 103764970 A 4/2014
DE 197 47 394 A1 4/1999
(Continued)

OTHER PUBLICATIONS

International Preliminary Report on Patentability and Written Opinion of the International Searching Authority for International Application No. PCT/JP2019/010555, dated Sep. 23, 2021, with an English translation.

(Continued)

Primary Examiner — Ngoc T Nguyen
(74) Attorney, Agent, or Firm — Birch, Stewart, Kolasch & Birch, LLP

(57) ABSTRACT

A surge suppression device for suppressing surge in an exhaust turbine-type turbocharger includes: a high-pressure tank configured to accumulate high-pressure gas with a higher pressure than atmospheric pressure; a high-pressure gas injection line connecting the high-pressure tank and an upstream intake passage on an upstream side of a compressor of the turbocharger; an on-off valve configured to open and close the high-pressure gas injection line; and a control device configured to control the on-off valve on the basis of (Continued)

a relationship between a pressure ratio of the compressor of the turbocharger and an intake flow rate.

10 Claims, 7 Drawing Sheets

(51) Int. Cl.
*F02M 26/37* (2016.01)
*F02B 37/12* (2006.01)

(56) References Cited

U.S. PATENT DOCUMENTS

| | | | |
|---|---|---|---|
| 2013/0213369 A1* | 8/2013 | Doko | F02M 25/06 123/574 |
| 2014/0190161 A1 | 7/2014 | Hayashi | |
| 2016/0222874 A1 | 8/2016 | Almkvist et al. | |
| 2018/0363541 A1 | 10/2018 | Sase et al. | |
| 2022/0120212 A1* | 4/2022 | Matoba | F02D 41/0007 |

FOREIGN PATENT DOCUMENTS

| | | |
|---|---|---|
| DE | 10 2013 220 036 A1 | 4/2015 |
| EP | 0 754 843 A2 | 1/1997 |
| JP | 57-158936 U | 3/1956 |
| JP | 1-166724 U | 11/1989 |
| JP | 9-32562 A | 2/1997 |
| JP | 2009-52488 A | 3/2009 |
| JP | 2013-53547 A | 3/2013 |
| JP | 2015-86810 A | 5/2015 |
| JP | 2018-109367 A | 7/2018 |
| JP | 2018-168823 A | 11/2018 |
| WO | WO 2017/154106 A1 | 9/2017 |
| WO | WO 2018/165772 A1 | 9/2018 |
| WO | WO-2019172238 A1 * | 9/2019 |

OTHER PUBLICATIONS

International Search Report for International Application No. PCT/JP2019/010555, dated Jun. 25, 2019.
Office Action dated Dec. 9, 2022 issued in counterpart Chinese Application No. 201980093823.4.
Office Action dated Jan. 10, 2023 issued in counterpart Japanese Application No. 2021-505454 with English Machine Translation.

* cited by examiner

UPSTREAM SIDE ←————→ DOWNSTREAM SIDE

AXIAL DIRECTION OF COMPRESSOR

SURGE SUPPRESSION DEVICE, EXHAUST TURBINE TYPE TURBOCHARGER AND SURGE SUPPRESSION METHOD

TECHNICAL FIELD

The present disclosure relates to a surge suppression device for suppressing surge in an exhaust turbine-type turbocharger, an exhaust turbine-type turbocharger having the surge suppression device, and a surge suppression method using the surge suppression device.

Engines used in automobiles and the like may be equipped with an exhaust turbine-type turbocharger in order to improve the output of the engine. The exhaust turbine-type turbocharger rotates the turbine with the exhaust gas from the engine to rotate a compressor (centrifugal compressor) connected to the turbine via a rotating shaft, and a combustion gas is compressed by the rotating compressor and is supplied to the engine.

Patent Document 1 discloses an auxiliary supercharging pressure supply device including a pressure tank having an inlet port connected to an inlet pipe connecting a compressor and an intake throttle valve to communicate with the inlet pipe and an injection port for injecting accumulated supercharging pressure into the compressor, a control valve provided in each of the inlet port and the injection port, and a control device for controlling the opening and closing of the control valve. The auxiliary supercharging pressure supply device injects the accumulated supercharging pressure accumulated in the pressure tank into the compressor in order to prevent a delay in the start-up of the compressor during sudden acceleration.

CITATION LIST

Patent Literature

Patent Document 1: Japanese Utility Model Application Laid-Open No. 1-166724

SUMMARY

Technical Problem

By the way, a compressor is required to have a wide operating range, but it is known that when the flow rate of the compressor decreases, an unstable phenomenon called surge occurs and the flow rate range is limited. In this regard, Patent Literature 1 does not disclose any findings for suppressing surge at low flow rates.

Further, conventionally, the combustion gas extracted from the downstream side of the compressor is immediately sent to the upstream side of the compressor via a recirculation flow path connecting the downstream side and the upstream side of the compressor. In this case, since the amount of combustion gas sent to the upstream side of the compressor is affected by the operating state of the compressor, surge at low flow rates may not be suppressed depending on the operating state of the compressor.

In view of the circumstances, an object of at least one embodiment of the present invention is to provide a surge suppression device capable of stably suppressing the occurrence of surge and extending the operating range of the compressor in a low flow rate range.

Solution to Problem (1) A surge suppression device according to at least one embodiment of the present invention is a surge suppression device for suppressing surge in an exhaust turbine-type turbocharger, including: a high-pressure tank configured to accumulate high-pressure gas with a higher pressure than atmospheric pressure; a high-pressure gas injection line connecting the high-pressure tank and an upstream intake passage on an upstream side of a compressor of the turbocharger; an on-off valve configured to open and close the high-pressure gas injection line; and a control device configured to control the on-off valve on the basis of a relationship between a pressure ratio of the compressor of the turbocharger and an intake flow rate.

According to the configuration of (1), the control device is configured to control the on-off valve on the basis of the relationship between the pressure ratio and the intake flow rate in the compressor of the turbocharger. Therefore, it is possible to instruct the on-off valve to open in an operation region where surge is likely to occur in the relationship. When the on-off valve that opens and closes the high-pressure gas injection line is open, since the high-pressure gas accumulated in the high-pressure tank has a higher pressure than the combustion gas flowing through the upstream intake passage, the high-pressure gas accumulated in the high-pressure tank flows into the upstream intake passage through the high-pressure gas injection line. Here, when the flow rate is low, in the vicinity of a shroud portion (a portion of the casing facing the tip of an impeller blade) of the casing of the turbocharger, the flow is separated from the shroud portion, and a negative pressure region is formed. The high-pressure gas that has flowed into the upstream intake passage is induced to flow in the negative pressure region and flows toward the downstream side in the axial direction toward the negative pressure region. Therefore, a flow rate component toward the downstream side in the axial direction, of the flow on the downstream side of the upstream intake passage in relation to the inlet port can be increased. By the surge suppressing device increasing the flow rate component of the flow near the inlet of the compressor toward the downstream side in the axial direction, it is possible to prevent the flow from being separated from an impeller blade and the shroud portion, and thus, to suppress the occurrence of surge. Therefore, the surge suppression device can widen the operating range of the compressor in the low flow rate range.

According to the configuration of (1), since the surge suppression device can accumulate the high-pressure gas in the high-pressure tank, the high-pressure gas can flow into the upstream intake passage at an intended timing regardless of the operating state of the engine and the turbocharger. In the surge suppression device, since the control device controls the opening and closing of the on-off valve, a required amount of high-pressure gas can flow into the upstream side intake passage. Therefore, according to the configuration, the surge suppression device can stably suppress the occurrence of surge as compared with the case where the high-pressure tank is not provided, and the opening and closing control of the on-off valve by the control device is prevented from becoming complex.

(2) In some embodiments, the surge suppression device according to (1) further includes: an exhaust gas intake line connecting the high-pressure tank and a downstream bypass passage on a downstream side of a waste gate valve provided in a bypass passage that connects an upstream exhaust passage on an upstream side of a turbine of the turbocharger and a downstream exhaust passage on a downstream side of the turbine.

According to the configuration (2), the surge suppression device can take the exhaust gas from the downstream bypass passage into the high-pressure tank via the exhaust gas intake line. Therefore, the surge suppression device can effectively utilize the exhaust gas that should be discharged to the outside, and can collect energy from the exhaust gas. Here, the exhaust gas flowing through the bypass passage connecting the upstream side exhaust passage and the downstream side exhaust passage has a higher pressure than the exhaust gas flowing through the downstream exhaust passage via the turbine since energy is not collected by the turbine. Therefore, the surge suppression device can effectively increase the flow rate component toward the downstream side in the axial direction of the flow near the inlet of the compressor by injecting the exhaust gas flowing through the bypass passage into the upstream intake passage.

(3) In some embodiments, the surge suppression device according to (1) or (2) further includes: an EGR gas intake line connecting the high-pressure tank and an EGR gas passage that connects a downstream exhaust passage on a downstream side of a turbine of the turbocharger and the upstream intake passage.

According to the configuration of (3), the surge suppression device can take the EGR (exhaust gas recirculation) gas from the EGR gas passage into the high-pressure tank via the EGR gas intake line. Therefore, the EGR gas can be effectively utilized.

(4) In some embodiments, the surge suppression device according to any one of (1) to (3) further includes: a blow-by gas intake line configured to send blow-by gas discharged from an engine to the high-pressure tank.

According to the configuration (4), the surge suppression device can take the blow-by gas discharged from the engine into the high-pressure tank via the blow-by gas intake line. Therefore, the surge suppression device can effectively utilize the blow-by gas that should be discharged to the outside, and can collect energy from the blow-by gas.

(5) In some embodiments, the surge suppression device according to any one of (1) to (4) further includes: a combustion gas intake line connecting the high-pressure tank and a downstream intake passage on a downstream side of the compressor.

According to the configuration (5), the surge suppression device can take the combustion gas compressed by the compressor from the downstream intake passage into the high-pressure tank. When compression by the compressor is not required, for example, when the brake of an automobile is operated, the compressed combustion gas can be effectively utilized by sending the compressed combustion gas to the high-pressure tank.

(6) In some embodiments, the surge suppression device according to any one of (1) to (5) further includes: an electric compressor configured to pump the high-pressure gas toward the high-pressure tank.

According to the configuration (6), the high-pressure gas can be pumped toward the high-pressure tank by the electric compressor. In this case, since the high-pressure gas can be more reliably accumulated in the high-pressure tank, the occurrence of surge can be suppressed more stably.

(7) In some embodiments, in the surge suppression device according to any one of (1) to (6), the high-pressure gas injection line includes at least one inlet port configured to inject the high-pressure gas into the upstream intake passage in a direction in which the high-pressure gas has a component directed toward a downstream side in an axial direction of the compressor at a meeting point of the high-pressure gas flowing through the high-pressure gas injection line and the combustion gas flowing through the upstream intake passage.

According to the configuration of (7), the high-pressure gas flows in the direction in which the high-pressure gas has the component directed toward the downstream side in the axial direction of the compressor at the meeting portion point of the high-pressure gas and the combustion gas flowing through the upstream intake passage. Therefore, the flow rate component toward the downstream side in the axial direction, of the flow on the downstream side of the upstream intake passage in relation to the inlet port can be effectively increased. Therefore, according to the configuration, by effectively increasing the flow rate component of the flow near the inlet of the compressor toward the downstream side in the axial direction, it is possible to more reliably prevent the flow from being separated from the impeller blade and the shroud portion, and thus, to more stably suppress the occurrence of surge.

(8) In some embodiments, in the surge suppression device according to any one of (1) to (7), the high-pressure gas injection line includes at least one inlet port configured to inject the high-pressure gas into the upstream intake passage in a direction in which the high-pressure gas has a component directed toward a downstream side in a rotating direction of the compressor at a meeting point of the high-pressure gas flowing through the high-pressure gas injection line and the combustion gas flowing through the upstream intake passage.

According to the configuration of (8), the high-pressure gas flows while turning in the direction in which the high-pressure gas has the component directed toward the downstream side in the rotating direction of the compressor at the meeting point of the high-pressure gas and the combustion gas flowing through the upstream intake passage. Therefore, the flow rate component (turning component) directed toward the downstream side in the rotating direction of the compressor, of the flow on the downstream side of the upstream side intake passage in relation to the inlet port can be effectively increased. Therefore, according to the configuration, by effectively increasing the turning component in the flow near the inlet of the compressor, it is possible to more reliably prevent the flow from being separated from the impeller blade and the shroud portion, and thus, to more stably suppress the occurrence of surge.

(9) A turbine-type turbocharger according to at least one embodiment of the present invention includes the surge suppression device according to any one of (1) to (8).

According to the configuration of (9), since the turbine-type turbocharger includes the surge suppression device, the occurrence of surge can be stably suppressed, and the operating range of the compressor in a low flow rate range can be widened.

(10) A surge suppression method according to at least one embodiment of the present invention is a surge suppression method using a surge suppression device that suppresses surge in an exhaust turbine-type turbocharger, the surge suppression device including: a high-pressure tank configured to accumulate high-pressure gas with a higher pressure than atmospheric pressure; a high-pressure gas injection line connecting the high-pressure tank and an upstream intake passage on an upstream side of a compressor of the turbocharger; and an on-off valve configured to open and close the high-pressure gas injection line, the surge suppression method comprising: accumulating the high-pressure gas in the high-pressure tank; and controlling the on-off valve on the basis of a relationship between a pressure ratio of the compressor of the turbocharger and an intake flow rate.

According to the method (10), the surge suppression method includes the step of controlling the on-off valve on the basis of the relationship between the pressure ratio and the intake flow rate in the compressor. Therefore, it is possible to instruct the on-off valve to open in an operation region where surge is likely to occur in the relationship. When the injection-side on-off valve that opens and closes the high-pressure gas injection line is open, the high-pressure gas accumulated in the high-pressure tank flows into the upstream intake passage and is induced to flow in the negative pressure region formed in the vicinity of the shroud portion and flows toward the downstream side in the axial direction toward the negative pressure region. Therefore, the flow rate component toward the downstream side in the axial direction, of the flow on the downstream side of the upstream intake passage in relation to the inlet port can be increased. In the step of controlling the on-off valve, by increasing the flow rate component of the flow near the inlet of the compressor toward the downstream side in the axial direction, it is possible to prevent the flow from being separated from the impeller blade and the shroud portion, and thus, to suppress the occurrence of surge. Therefore, the surge suppression method can widen the operating range of the compressor in the low flow rate range.

According to the method (10), since the surge suppression method can accumulate the high-pressure gas in the high-pressure tank, the high pressure can flow into the upstream intake passage at an intended timing regardless of the operating state of the engine and the turbocharger. By controlling the opening and closing of the on-off valve, a required amount of high-pressure gas can flow into the upstream side intake passage. Therefore, according to the method, it is possible to stably suppress the occurrence of surge as compared with the case where the high-pressure tank is not provided.

Advantageous Effects

According to at least one embodiment of the present invention, there is provided a surge suppression device capable of stably suppressing the occurrence of surge and extending the operating range of the compressor in a low flow rate range.

DETAILED DESCRIPTION

Figure 1:
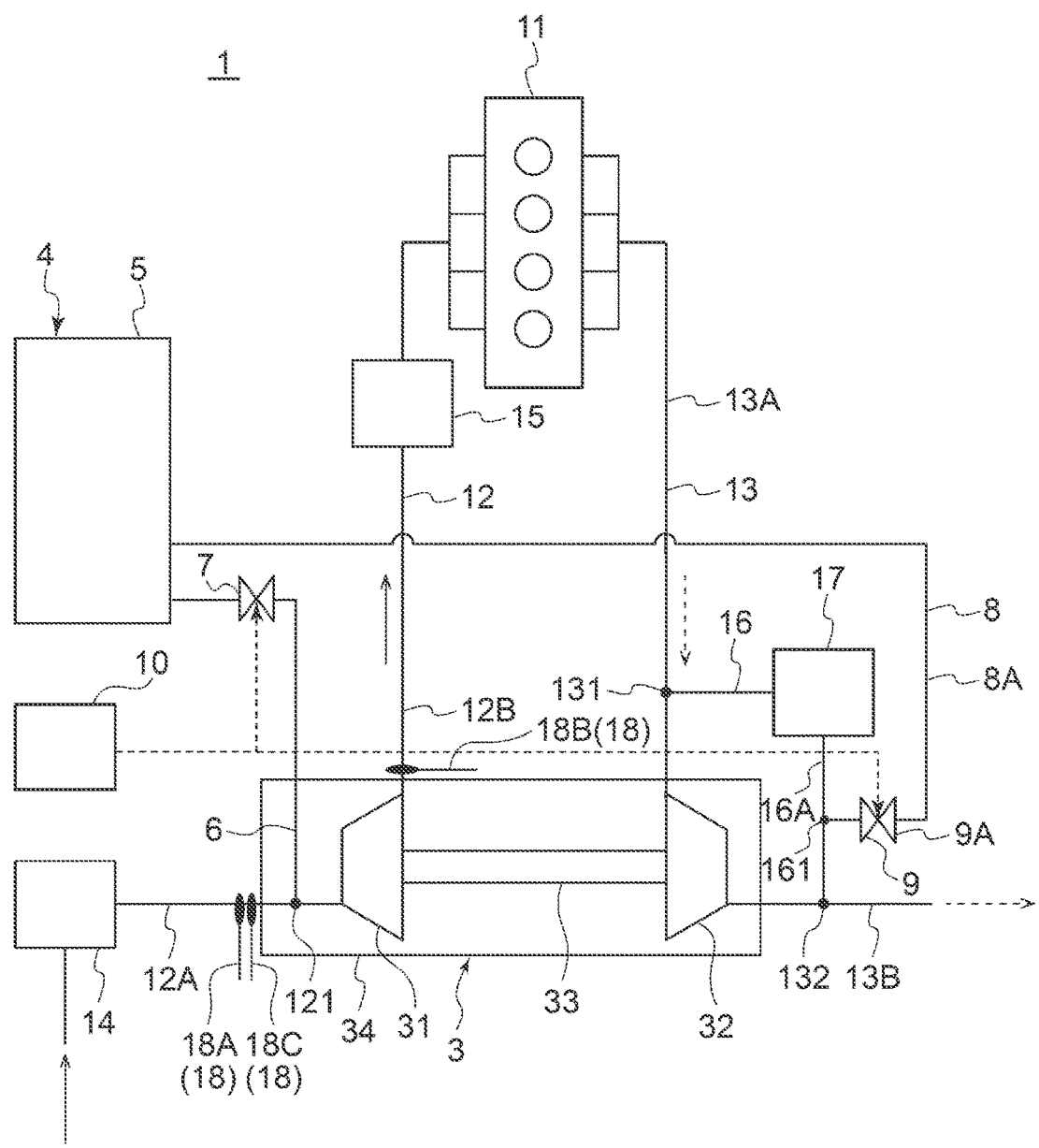
FIG. 1 is a diagram schematically illustrating a configuration of an exhaust turbine-type turbocharger according to an embodiment.

Embodiments of the present invention will now be described in detail with reference to the accompanying drawings. It is intended, however, that unless particularly specified, dimensions, materials, shapes, relative positions and the like of components described in the embodiments or indicated in the drawings shall be interpreted as illustrative only and not limitative of the scope of the present invention.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same" "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise", "include", and "have" are not intended to be exclusive of other components.

The same reference numerals are assigned to the same configurations, and the description thereof may be omitted.

FIG. 1 is a diagram schematically illustrating a configuration of an exhaust turbine-type turbocharger according to an embodiment.

As illustrated in FIG. 1, a surge suppression device 4 according to some embodiments is a device for suppressing the occurrence of surge in an exhaust turbine-type turbocharger 1, and is mounted on the turbocharger 1.

As illustrated in FIG. 1, the turbocharger 1 includes a turbocharger body 3 (turbocharger), the surge suppression device 4, an intake passage 12 through which combustion gas supplied to the engine 11 flows, and an exhaust passage 13 through which the exhaust gas discharged from the engine 11 flows. Examples of the combustion gas include fresh air, EGR gas, and a mixture gas thereof.

As illustrated in FIG. 1, the turbocharger body 3 includes a compressor 31 provided in the intake passage 12, a turbine 32 provided in the exhaust passage 13, a rotating shaft 33 mechanically connecting the compressor 31 and the turbine 32, and a casing 34 configured to accommodate the compressor 31, the turbine 32 and the rotating shaft 33. The compressor 31 and the turbine 32 are configured to be integrally rotatable via the rotating shaft 33.

The turbocharger body 3 is configured such that the turbine 32 is rotated by the exhaust gas discharged from the engine 11, and the combustion gas flowing through the intake passage 12 is compressed by the compressor 31 which is rotated on the same axis in conjunction with the turbine 32.

As illustrated in FIG. 1, the upstream side of the intake passage 12 in relation to the compressor 31 is defined as an upstream intake passage 12A, and the downstream side in relation to the compressor 31 is defined as a downstream intake passage 12B. The downstream intake passage 12B connects the downstream side of the compressor 31 and the upstream side of the engine 11. Further, as illustrated in FIG. 1, the upstream side of the exhaust passage 13 in relation to the turbine 32 is defined as an upstream exhaust passage 13A, and the downstream side in relation to the turbine 32 is defined as a downstream exhaust passage 13B. The upstream exhaust passage 13A connects the downstream side of the engine 11 and the upstream side of the turbine 32.

In the embodiment illustrated in FIG. 1, the turbocharger 1 is provided with an air cleaner 14 for removing dust and dirt from the combustion gas in the upstream intake passage 12A. In the embodiment illustrated in FIG. 1, an air cooler 15 for cooling the combustion gas compressed by the compressor 31 and having a temperature rise is provided in the downstream intake passage 12B.

As illustrated in FIG. 1, in the illustrated embodiment, the turbocharger 1 includes a bypass passage 16 configured to send the exhaust gas discharged from the engine 11 from the upstream side of the turbine 32 toward the downstream side without passing through the turbine 32 and a waste gate valve 17 provided in the bypass passage 16. The downstream side of the bypass passage 16 in relation to the waste gate valve 17 is defined as a downstream bypass passage 16A.

In the embodiment illustrated in FIG. 1, the bypass passage 16 is connected to a branch portion 131 provided in the upstream exhaust passage 13A and a meeting portion 132 provided in the downstream exhaust passage 13B, as illustrated in FIG. 1. The waste gate valve 17 is configured to be able to open and close the bypass passage 16.

By opening the waste gate valve 17 and diverting a portion of the exhaust gas flowing toward the turbine 32 to the bypass passage 16, the amount and energy of the exhaust gas injected into the turbine 32 can be reduced, and eventually the supercharging pressure of the combustion gas can be reduced.

As illustrated in FIG. 1, the surge suppression device 4 includes a high-pressure tank 5 configured to accumulate a high-pressure gas with a higher pressure than the atmospheric pressure, a high-pressure gas injection line 6 connecting the upstream intake passage 12A and the high-pressure tank 5, an injection-side on-off valve 7 configured to open and close the high-pressure gas injection line 6, and a control device 10 configured to control the opening and closing of the injection-side on-off valve 7.

The injection-side on-off valve 7 is electrically connected to the control device 10, has a motor and an actuator (not illustrated) that operate in response to a signal sent from the control device 10, and is configured to open and close according to an instruction from the control device 10. The injection-side on-off valve 7 may be an on-off valve or an opening adjustment valve whose opening can be adjusted.

In the illustrated embodiment, the injection-side on-off valve 7 is an opening adjustment valve, and is configured to be switched to an opening degree according to an opening degree instruction instructed by the control device 10. In this case, the injection-side on-off valve 7 can adjust the flow rate of the high-pressure gas flowing on the downstream side of the high-pressure gas injection line 6 in relation to the injection-side on-off valve 7 by switching to an opening degree corresponding to the opening degree instruction instructed by the control device 10.

In the illustrated embodiment, the high-pressure tank 5 is configured to be located outside the turbocharger body 3 and the engine 11.

In the illustrated embodiment, as illustrated in FIG. 1, the high-pressure gas injection line 6 connects the high-pressure tank 5 and a meeting portion 121 provided inside the casing 34 on the downstream side of the upstream intake passage 12A in relation to the air cleaner 14. In some other embodiments, the meeting portion 121 may be provided on the upstream side of the upstream intake passage 12A in relation to the casing 34.

Figure 2:
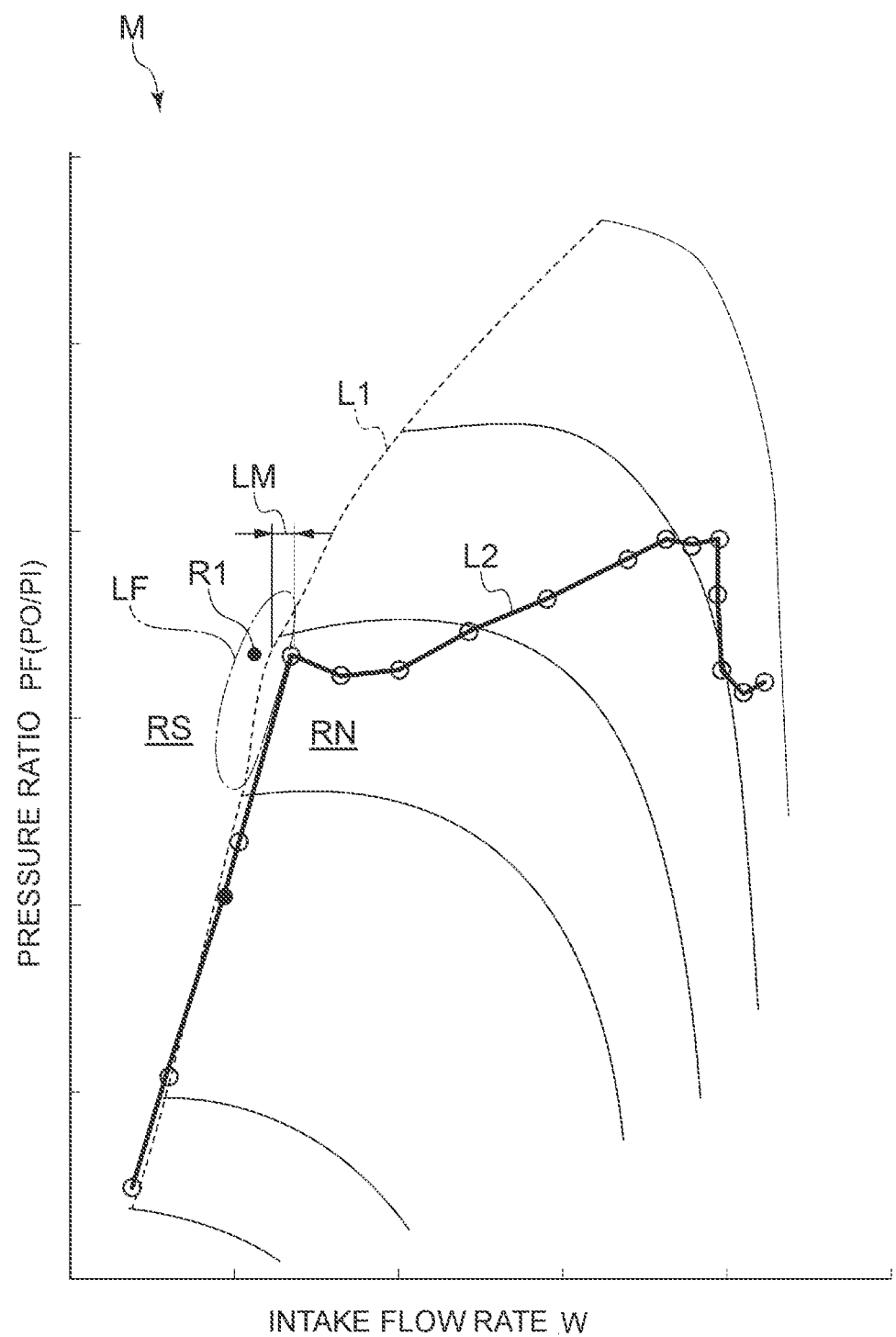
FIG. 2 is a graph for explaining the relationship between a pressure ratio and an intake flow rate in a compressor.

FIG. 2 is a diagram illustrating a compressor map according to an embodiment.

In the compressor map M illustrated in FIG. 2, the horizontal axis is the intake flow rate W of the compressor 31, and the vertical axis is the pressure ratio PF of the compressor 31 (the pressure ratio of the outlet pressure PO to the inlet pressure PI). The compressor map M is prepared in advance by a steady-state test. The operation region and efficiency of the turbocharger body 3 can be determined from the position of the operating point R1 of the compressor 31 on the compressor map M.

FIG. 2 illustrates a designed surge line L1 of the turbocharger body 3 and a designed engine operating line L2. The surge line L1 and the engine operating line L2 do not take the surge suppression device 4 into consideration. As illustrated in the figure, a surge operation region RS (left side in the figure) and a normal operation region RN (right side in the figure) are defined with the surge line L1 as a boundary. Here, the surge operation region RS is a region where surge is likely to occur, and the normal operation region RN is a region in which the turbocharger body 3 normally operates. The engine operating line L2 is set to have a low-flow-rate-side margin LM between the engine operating line L2 and the surge line L1.

As illustrated in FIG. 2, in the compressor map M, a low-flow-rate operation region LF, which is an operation region where surge is likely to occur, is set in advance. In the illustrated embodiment, the low-flow-rate operation region LF is a region including the surge line L1. In the embodiment illustrated in FIG. 2, the low-flow-rate operation region LF is a region including both a portion of the surge operation region RS adjacent to the surge line L1 and a portion of the normal operation region RN adjacent to the surge line L1. In some other embodiments, the low-flow-rate operation region LF may include either a portion of the surge operation region RS adjacent to the surge line L1 or a portion of the normal operation region RN adjacent to the surge line L1.

Figure 3:
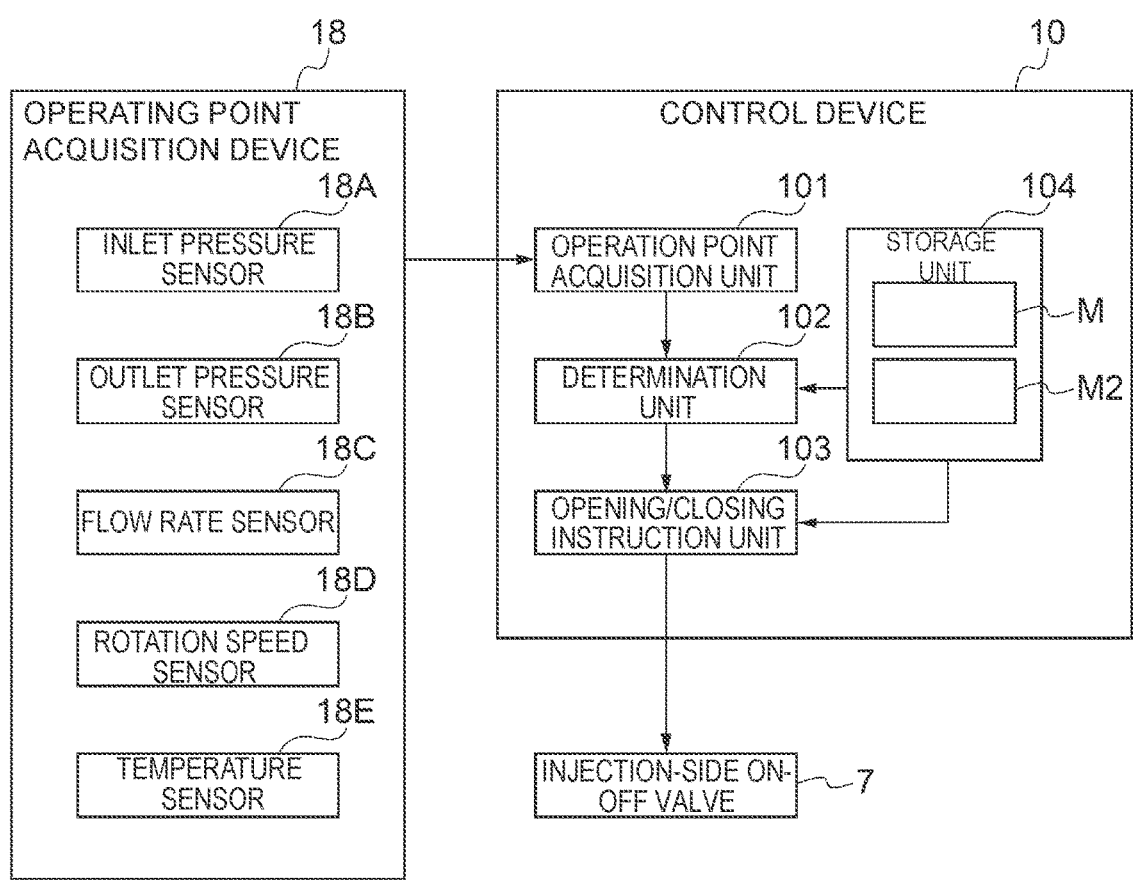
FIG. 3 is a block diagram of a control device according to an embodiment.

FIG. 3 is a block diagram of the control device according to the embodiment.

In the illustrated embodiment, the turbocharger 1 further comprises an operating point acquisition device 18 configured to acquire information about the operating point R1 of the compressor 31, as illustrated in FIG. 1.

As illustrated in FIG. 3, the control device 10 is electrically connected to the operating point acquisition device 18, and is configured such that information about the operating point R1 of the compressor 31 is sent from the operating point acquisition device 18. The control device 10 includes an operation point acquisition unit 101 configured to acquire the operation point R1 from the information about the operation point R1 of the compressor 31.

In the embodiment illustrated in FIG. 1, the operating point acquisition device 18 includes an inlet pressure sensor 18A provided in the upstream intake passage 12A so as to detect an inlet pressure PI of the compressor 31, an outlet pressure sensor 18B provided in the downstream intake passage 12B so as to detect an outlet pressure PO of the compressor 31, and a flow rate sensor 18C provided in the upstream intake passage 12A so as to detect an intake flow rate W injected into the compressor 31. In this case, the operating point acquisition unit 101 calculates the pressure ratio PF from the inlet pressure PI detected by the inlet pressure sensor 18A and the outlet pressure PO detected by the outlet pressure sensor 18B and acquires the operating range R1 from the calculated pressure ratio PF and the intake flow rate W detected by the flow rate sensor 18C. If the control device 10 can acquire the operating point R1 of the compressor 31, a sensor different from the sensors may be used.

The control device 10 is configured to control the opening and closing of the injection-side on-off valve 7 on the basis of the relationship between the pressure ratio and the intake flow rate in the compressor 31. In the illustrated embodiment, the control device 10 is configured as a microcomputer including a central processing unit (CPU), a random access memory (RAM), a read-only memory (ROM), an I/O interface, and the like. In a certain embodiment, the control device 10 is configured as an electronic control unit (ECU device) for controlling the engine 11.

As illustrated in FIG. 3, the control device 10 includes the operation point acquisition unit 101, a determination unit 102 configured to determine whether the operation point R1 is located within the low-flow-rate operation region LF, an opening/closing instruction unit 103 configured to instruct the injection-side on-off valve 7 to perform an opening and closing operation, and a storage unit 104 in which the compressor map M is stored. In the illustrated embodiment, a control map M2 having the operation point R1 as an input value and the opening degree of the injection-side on-off valve 7 as an output value is stored in advance in the storage unit 104.

The determination unit 102 determines whether the operation point R1 acquired by the operation point acquisition unit 101 is located within the low-flow-rate operation region LF of the compressor map M. The determination unit 102 determines whether the operation point R1 is located within the low-flow-rate operation region LF in the compressor map M by comparing the operation point R1 with the compressor map M accumulated in the storage unit 104.

When the determination unit 102 determines that the operation point R1 is located within the low-flow-rate operation region LF, the opening/closing instruction unit 103 instructs the injection-side on-off valve 7 to open. In the illustrated embodiment, the opening/closing instruction unit 103 instructs the injection-side on-off valve 7 about the opening degree of the injection-side on-off valve 7 acquired from the operation point R1 on the basis of the control map M2.

Figure 4:
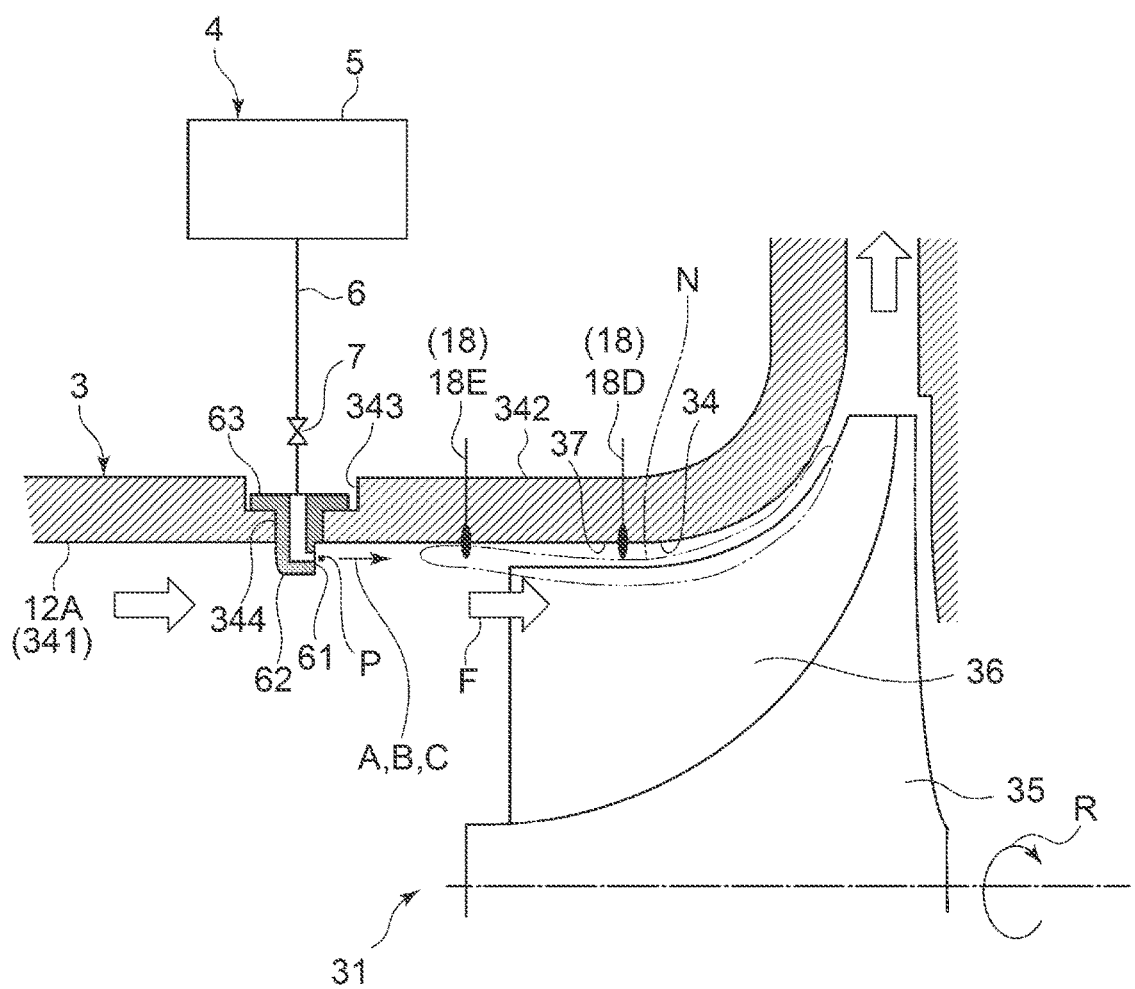
FIG. 4 is a schematic cross-sectional view taken along the axis of the compressor in an embodiment.

FIG. 4 is a schematic cross-sectional view along the axis of the compressor in one embodiment.

As illustrated in FIG. 4, the high-pressure gas injection line 6 includes at least one inlet port 61 that injects the high-pressure gas at a meeting point P of the high-pressure gas flowing through the high-pressure gas injection line 6 and the combustion gas flowing through the upstream intake passage 12A.

As illustrated in FIG. 4, when the flow rate of the combustion gas injected into the compressor 31 is low, in the vicinity of a shroud portion 37 of the casing 34 of the turbocharger body 3 (a portion of the casing 34 facing the tip of an impeller blade 36 of an impeller 35 of the compressor 31), the flow F is separated from the shroud portion 37 and a negative pressure region N is formed.

As illustrated in FIG. 1, for example, the surge suppression device 4 according to some embodiments includes the high-pressure tank 5 configured to accumulate a high-pressure gas with a higher pressure than the atmospheric pressure, the high-pressure gas injection line 6 connecting the upstream intake passage 12A and the high-pressure tank 5, the injection-side on-off valve 7 (on-off valve) configured to open and close the high-pressure gas injection line 6, and the control device 10 configured to control the injection-side on-off valve 7 on the basis of the relationship between the pressure ratio and the intake flow rate in the compressor 31 of the turbocharger body 3.

According to the configuration, the control device 10 is configured to control the injection-side on-off valve 7 on the basis of the relationship between the pressure ratio and the intake flow rate in the compressor 31 of the turbocharger body 3. Therefore, it is possible to instruct the injection-side on-off valve 7 to open in an operation region (low-flow-rate operation region LF) where surge is likely to occur in the relationship. When the injection-side on-off valve 7 that opens and closes the high-pressure gas injection line 6 is open, since the high-pressure gas accumulated in the high-pressure tank 5 has a higher pressure than the combustion gas flowing through the upstream intake passage 12A, the high-pressure gas accumulated in the high-pressure tank 5 flows into the upstream intake passage 12A through the high-pressure gas injection line 6. Here, when the flow rate is low, in the vicinity of the shroud portion 37 of the casing 34 of the turbocharger body 3, the flow F is separated from the shroud portion 37, and a negative pressure region N is formed. The high-pressure gas that has flowed into the upstream intake passage 12A is induced to flow in the negative pressure region N and flows toward the downstream side in the axial direction toward the negative pressure region N. Therefore, the flow rate component toward the downstream side in the axial direction, of the flow on the downstream side of the upstream intake passage 12A in relation to the inlet port 61 can be increased. By the surge suppressing device 4 increasing the flow rate component of the flow F near the inlet of the compressor 31 toward the downstream side in the axial direction, it is possible to prevent the flow F from being separated from the impeller blade 36 and the shroud portion 37, and thus, to suppress the occurrence of surge. Therefore, the surge suppression device 4 can widen the operating range of the compressor 31 in the low flow rate range.

According to the configuration, since the surge suppression device 4 can accumulate the high-pressure gas in the high-pressure tank 5, the high-pressure gas can flow into the upstream intake passage 12A at an intended timing regardless of the operating state of the engine 11 and the turbocharger body 3. In the surge suppression device 4, since the control device 10 controls the opening and closing of the injection-side on-off valve 7, a required amount of high-pressure gas can flow into the upstream side intake passage 12A. Therefore, according to the configuration, the surge suppression device 4 can stably suppress the occurrence of surge as compared with the case where the high-pressure tank 5 is not provided, and the opening and closing control of the injection-side on-off valve 7 by the control device 10 is prevented from becoming complex.

Figure 5:
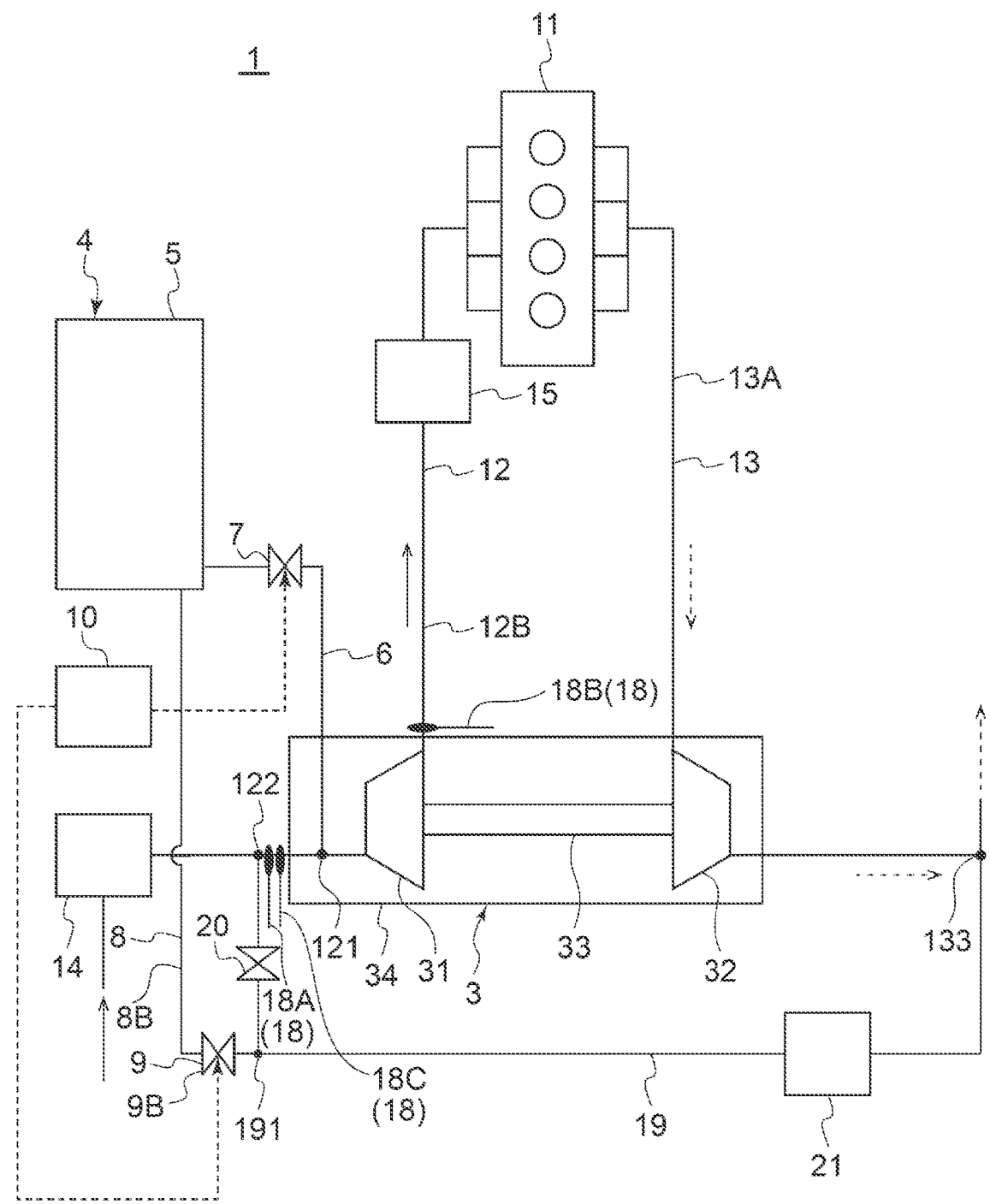
FIG. 5 is a diagram schematically illustrating a configuration of an exhaust turbine-type turbocharger according to another embodiment.
Figure 6:
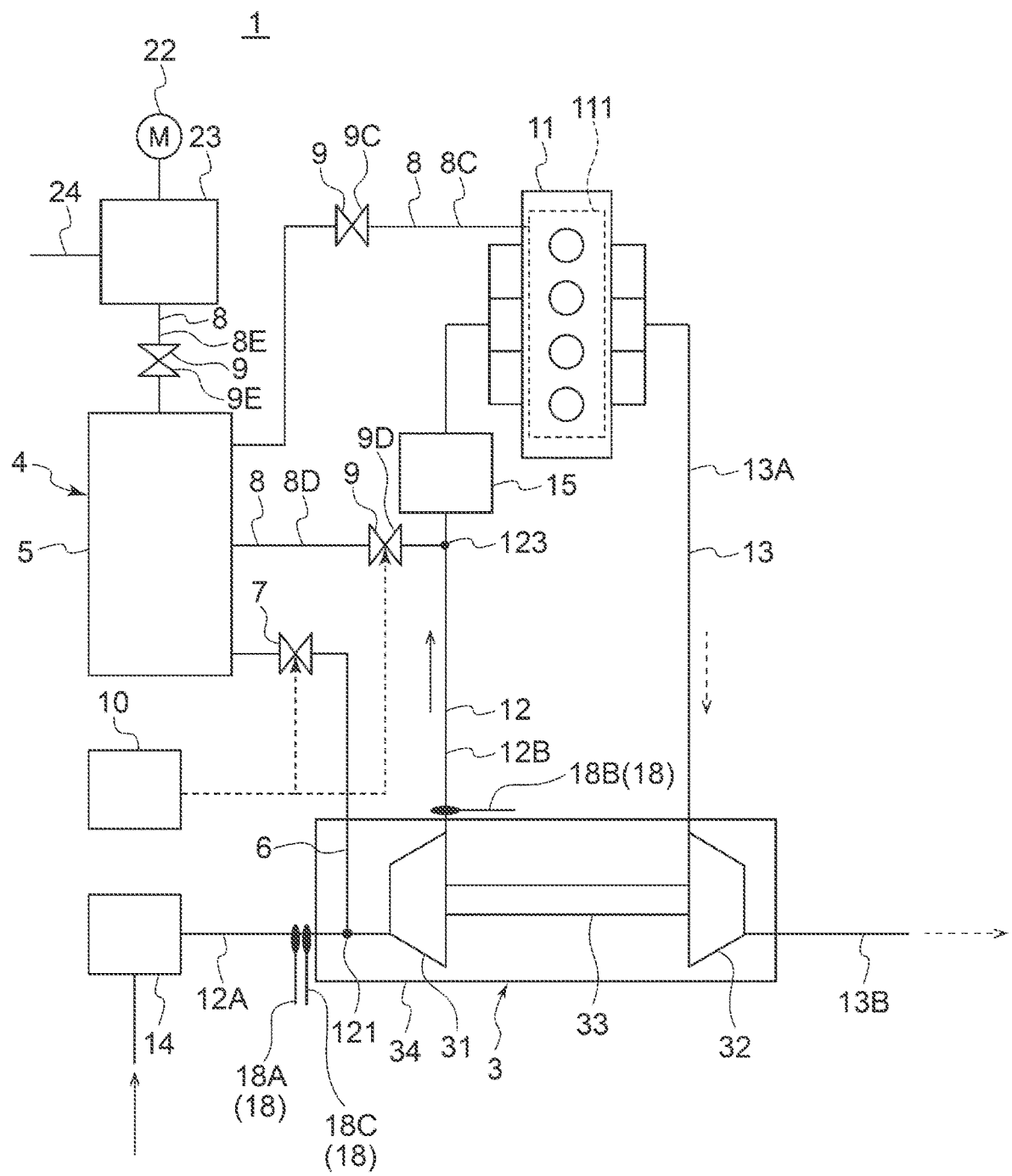
FIG. 6 is a diagram schematically illustrating a configuration of an exhaust turbine-type turbocharger according to another embodiment.

FIG. 5 is a diagram schematically illustrating a configuration of an exhaust turbine-type turbocharger according to another embodiment. FIG. 6 is a diagram schematically illustrating a configuration of an exhaust turbine-type turbocharger according to another embodiment.

In some embodiments, as illustrated in FIGS. 1, 5, and 6, the surge suppression device 4 includes the high-pressure tank 5, the high-pressure gas injection line 6, the injection-side on-off valve 7, the control device 10, at least one high-pressure gas intake line 8 configured to send high-pressure gas to the high-pressure tank 5, and an intake-side on-off valve 9 configured to open and close the high-pressure gas intake line 8. The control device 10 is configured to control the opening and closing of the intake-side on-off valve 9.

The intake-side on-off valve 9 is electrically connected to the control device 10, has a motor and an actuator (not illustrated) that operate in response to a signal sent from the control device 10, and is configured to open and close according to an instruction of the control device 10. The intake-side on-off valve 9 may be an on-off valve or an opening adjustment valve whose opening can be adjusted.

In the illustrated embodiment, the intake-side on-off valve 9 is an opening adjustment valve, and is configured to be switched to an opening degree according to an opening degree instruction instructed by the control device 10. In this case, the intake-side on-off valve 9 is switched to an opening degree corresponding to the opening degree instruction instructed by the control device 10, whereby the flow rate of the high-pressure gas flowing on the downstream side of the high-pressure gas intake line 8 in relation to the intake-side on-off valve 9 can be adjusted.

According to the configuration, the surge suppression device 4 can send high-pressure gas to the high-pressure tank 5 via the high-pressure gas intake line 8 from a high-pressure unit that accumulates high-pressure gas possessed by the turbocharger 1 or the engine 11, an automobile having the engine 11 mounted thereon, and the like. By the control device 10 controlling the opening and closing of the intake-side on-off valve 9, a required amount of high-pressure gas can be taken into the high-pressure tank 5.

In some embodiments, as illustrated in FIG. 1, the surge suppression device 4 includes the exhaust gas intake line 8A connecting the downstream bypass passage 16A and the high-pressure tank 5. In other words, the at least one high-pressure gas intake line 8 includes the exhaust gas intake line 8A. The intake-side on-off valve 9 includes an intake-side on-off valve 9A provided in the exhaust gas intake line 8A.

In the embodiment illustrated in FIG. 1, the exhaust gas intake line 8A is connected to the high-pressure tank 5 and a branch portion 161 provided in the downstream bypass passage 16A. The exhaust gas flowing through the downstream bypass passage 16A has a higher pressure than the atmospheric pressure and the exhaust gas flowing through the downstream exhaust passage 13B.

According to the configuration, the surge suppression device 4 can take the exhaust gas from the downstream bypass passage 16A into the high-pressure tank 5 via the exhaust gas intake line 8A. Therefore, the surge suppression device 4 can effectively utilize the exhaust gas that should be discharged to the outside, and can collect energy from the exhaust gas. Here, the exhaust gas flowing through the bypass passage 16 connecting the upstream side exhaust passage 13A and the downstream side exhaust passage 13B has a higher pressure than the exhaust gas flowing through the downstream exhaust passage 13B via the turbine 32 since energy is not collected by the turbine 32. Therefore, the surge suppression device 4 can effectively increase the flow rate component toward the downstream side in the axial direction of the flow F near the inlet of the compressor 31 by introducing the exhaust gas flowing through the bypass passage 16 into the upstream intake passage 12A.

In some embodiments, as illustrated in FIG. 5, the turbocharger 1 includes an EGR gas passage 19 connecting the downstream exhaust passage 13B and the upstream intake passage 12A and an EGR gas valve 20 configured to open and close the EGR gas passage 19. The turbocharger 1 is configured such that a portion of the exhaust gas discharged from the engine 11 to flow through the downstream exhaust passage 13B is circulated toward the upstream side of the compressor 31 as an EGR gas with the aid of the EGR gas passage 19 and the EGR gas valve 20.

As illustrated in FIG. 5, the surge suppression device 4 includes an EGR gas intake line 8B connecting the EGR gas passage 19 and the high-pressure tank 5. In other words, the at least one high-pressure gas intake line 8 includes the EGR gas intake line 8B. The intake-side on-off valve 9 includes an intake-side on-off valve 9A provided in the EGR gas intake line 8B.

In the illustrated embodiment, the EGR gas valve 20 is electrically connected to the control device 10, has a motor and an actuator (not illustrated) that operate in response to a signal sent from the control device 10, and is configured to open and close according to an instruction from the control device 10. The EGR gas valve 20 may be an on-off valve or an opening adjustment valve whose opening can be adjusted.

In the embodiment illustrated in FIG. 5, the EGR gas valve 20 is an opening adjustment valve, and is configured to be switched to an opening degree according to an opening degree instruction instructed by the control device 10. In this case, the EGR gas valve 20 can adjust the flow rate of the EGR gas recirculated to the upstream intake passage 12A by switching to an opening degree corresponding to the opening degree instruction instructed by the control device 10.

In the embodiment illustrated in FIG. 5, the turbocharger 1 includes an exhaust gas desulfurization device 21 provided on the upstream side of the EGR gas passage 19 in relation to the EGR gas valve 20 and configured to desulfurize the exhaust gas flowing through the EGR gas passage 19. The EGR gas passage 19 is connected to a branch portion 133 of the downstream exhaust passage 13B and a meeting portion 122 of the upstream intake passage 12A. The meeting portion 122 is located on the upstream side of the meeting portion 121. In the illustrated embodiment, the meeting portion 122 is located on the upstream side of the casing 34, but may be located inside the casing 34.

In the embodiment illustrated in FIG. 5, the EGR gas intake line 8B is connected to the high-pressure tank 5 and a branch portion 191 provided on the upstream side and the downstream side of the EGR gas passage 19 in relation to the EGR gas valve 20 and the exhaust gas desulfurization device 21, respectively. In this case, the EGR gas after being desulfurized by the exhaust gas desulfurization device 21 is sent from the EGR gas passage 19 to the EGR gas intake line 8B. The exhaust gas flowing through the EGR gas passage 19 has a higher pressure than the atmospheric pressure.

According to the configuration, the surge suppression device 4 can take the EGR gas from the EGR gas passage 19 into the high-pressure tank 5 via the EGR gas intake line 8B. Therefore, the EGR gas can be effectively utilized.

In some embodiments, as illustrated in FIG. 6, the surge suppression device 4 includes a blow-by gas intake line 8C configured to send blow-by gas discharged from the engine 11 to the high-pressure tank 5. In other words, the at least one high-pressure gas intake line 8 includes the blow-by gas intake line 8C. The intake-side on-off valve 9 includes an intake-side on-off valve 9C provided in the blow-by gas intake line 8C.

In the embodiment illustrated in FIG. 6, the engine 11 has a pressure accumulation unit 111 that accumulates the blow-by gas discharged from the combustion chamber of the engine 11. The blow-by gas intake line 8C is connected to the pressure accumulation unit 111 and the high-pressure tank 5. The blow-by gas has a higher pressure than the atmospheric pressure.

According to the configuration, the surge suppression device 4 can take the blow-by gas discharged from the engine 11 into the high-pressure tank 5 via the blow-by gas intake line 8C. Therefore, the surge suppression device 4 can effectively utilize the blow-by gas that should be discharged to the outside, and can collect energy from the blow-by gas.

In some embodiments, as illustrated in FIG. 6, the surge suppression device 4 includes a combustion gas intake line 8D connecting the downstream intake passage 12B and the high-pressure tank 5. In other words, the at least one high-pressure gas intake line 8 includes the combustion gas intake line 8D. The intake-side on-off valve 9 includes an intake-side on-off valve 9D provided in the combustion gas intake line 8D.

In the embodiment illustrated in FIG. 6, the combustion gas intake line 8D is connected to the high-pressure tank 5 and a branch portion 123 provided in the downstream intake passage 12B. The combustion gas flowing through the downstream intake passage 12B has a higher pressure than the atmospheric pressure.

According to the configuration, the surge suppression device 4 can take the combustion gas compressed by the compressor 31 from the downstream intake passage 12B into the high-pressure tank 5. When compression by the compressor 31 is not required, for example, when the brake of an automobile is operated, the compressed combustion gas can be effectively utilized by sending the compressed combustion gas to the high-pressure tank 5.

In some embodiments, the surge suppression device 4 further includes an electric compressor 22 configured to pump the high-pressure gas toward the high-pressure tank 5.

In the illustrated embodiment, as illustrated in FIG. 6, the turbocharger 1 includes a gas tank 23 configured to be filled with gas and a gas injection line 24 configured to inject gas into the gas tank 23.

In the illustrated embodiment, the electric compressor 22 is driven by electric power and is configured to compress the gas in the gas tank 23. As illustrated in FIG. 6, the surge suppression device 4 includes a compressed air injection line 8E connecting the gas tank 23 and the high-pressure tank 5. In other words, the at least one high-pressure gas intake line 8 includes the compressed air injection line 8E. The intake-side on-off valve 9 includes an intake-side on-off valve 9E provided in the compressed air injection line 8E.

The compressed gas compressed in the gas tank 23 and flowing through the compressed air injection line 8E has a higher pressure than the atmospheric pressure. In some embodiments, one end of the gas injection line 24 is open so that air in the atmosphere is injected into the gas tank 23 via the gas injection line 24.

In some other embodiments, the electric compressor 22 may be configured to compress the gas in the high-pressure tank 5.

According to the configuration, the high-pressure gas can be pumped toward the high-pressure tank 5 by the electric compressor 22. In this case, since the high-pressure gas can be more reliably accumulated in the high-pressure tank 5, the occurrence of surge can be suppressed more stably. In particular, power consumption can be suppressed by configuring the electric compressor 22 to be driven by surplus electric power of the turbocharger 1, the engine 11, an automobile having the engine 11 mounted thereon, or the like.

In some embodiments, as illustrated in FIG. 4, the at least one inlet port 61 is configured to inject the high-pressure gas into the upstream intake passage 12A in a direction C in which the high-pressure gas has a component A directed toward the downstream side in the axial direction of the compressor 31 at the meeting point P. In the embodiment illustrated in FIG. 4, the inlet port 61 is configured to inject high-pressure gas along the axial direction, whereas in some other embodiments, the inlet port 61 may be configured to inject the high-pressure gas in a direction inclined toward the inner side in the radial direction or the outer side in the radial direction.

In the illustrated embodiment, as illustrated in FIG. 4, the upstream intake passage 12A includes a tubular portion 341 having a through-hole 344 formed in the peripheral surface. In certain embodiments, the casing 34 has the tubular portion 341. The high-pressure gas injection line 6 includes a nozzle portion 62 having the inlet port 61 at the tip thereof and being configured to be inserted into the through-hole 344. That is, the tubular portion 341 and the nozzle portion 62 are separate bodies. The nozzle portion 62 is configured such that the inlet port 61 is located in the upstream intake passage 12A when the nozzle portion 62 is inserted into the through-hole 344.

In the embodiment illustrated in FIG. 4, the nozzle portion 62 includes a flange portion 63 configured to be fixed to an outer peripheral surface 342 of the tubular portion 341 by a bolt (fastener) (not illustrated). As illustrated in FIG. 4, a counterbore 343 in which the flange portion 63 is received may be formed in the outer peripheral surface 342 of the tubular portion 341, and the counterbore 343 may communicate with the through-hole 344.

According to the configuration, the high-pressure gas flows in the direction C in which the high-pressure gas has the component A directed toward the downstream side in the axial direction of the compressor 31 at the meeting point P of the high-pressure gas and the combustion gas flowing through the upstream intake passage 12A. Therefore, the flow rate component toward the downstream side in the axial direction, of the flow on the downstream side of the upstream intake passage 12A in relation to the inlet port 61 can be effectively increased. Therefore, according to the configuration, by effectively increasing the flow rate component of the flow F near the inlet of the compressor 31 toward the downstream side in the axial direction, it is possible to more reliably prevent the flow from being separated from the impeller blade 36 and the shroud portion 37, and thus, to more stably suppress the occurrence of surge.

In some embodiments, as illustrated in FIG. 4, the at least one inlet port 61 is configured to inject the high-pressure gas into the upstream intake passage 12A in a direction C in which the high-pressure gas has a component B directed toward the downstream side in the rotating direction R of the compressor 31 at the meeting point P. In the embodiment illustrated in FIG. 4, the direction C has both the component A and the component B, but in some other embodiments, the direction C may have either the component A or the component B.

According to the configuration, the high-pressure gas flows while turning in the direction C in which the high-pressure gas has the component B directed toward the downstream side in the rotating direction R of the compressor 31 at the meeting point P of the high-pressure gas and the combustion gas flowing through the upstream intake passage 12A. Therefore, the flow rate component (turning component) directed toward the downstream side in the rotating direction R of the compressor 31, of the flow on the downstream side of the upstream side intake passage 12A in relation to the inlet port 61 can be effectively increased. Therefore, according to the configuration, by effectively increasing the turning component in the flow F near the inlet of the compressor 31, it is possible to more reliably prevent the flow from being separated from the impeller blade 36 and the shroud portion 37, and thus, to more stably suppress the occurrence of surge.

In some embodiments, the operating point acquisition device 18 includes the inlet pressure sensor 18A and the outlet pressure sensor 18B, and a rotation speed sensor 18D capable of detecting the rotation speed of the compressor 31. In some other embodiments, the operating point acquisition device 18 includes the flow rate sensor 18C and the rotation speed sensor 18D. In the embodiment illustrated in FIG. 4, the rotation speed sensor 18D is attached to the shroud portion 37. In these cases, the control device 10 can acquire the operating point R1 on the basis of the information acquired by the operating point acquisition device 18.

In some other embodiments, the operating point acquisition device 18 includes a temperature sensor 18E capable of detecting the temperature in the vicinity of the shroud portion 37 of the casing 34. In the embodiment illustrated in FIG. 4, the temperature sensor 18E is attached to the shroud portion 37. In this case, since the temperature rises when a backflow occurs in the vicinity of the shroud portion 37, whether the backflow is occurring can be grasped by the temperature sensor 18E. Therefore, by including the temperature sensor 18E in the operating point acquisition device 18, the occurrence of surge can be suppressed more stably.

In some embodiments, the turbine-type turbocharger 1 includes the surge suppression device 4. In this case, since the turbine-type turbocharger 1 includes the surge suppression device 4, the occurrence of surge can be stably suppressed, and the operating range of the compressor 31 in a low flow rate range can be widened.

Figure 7:
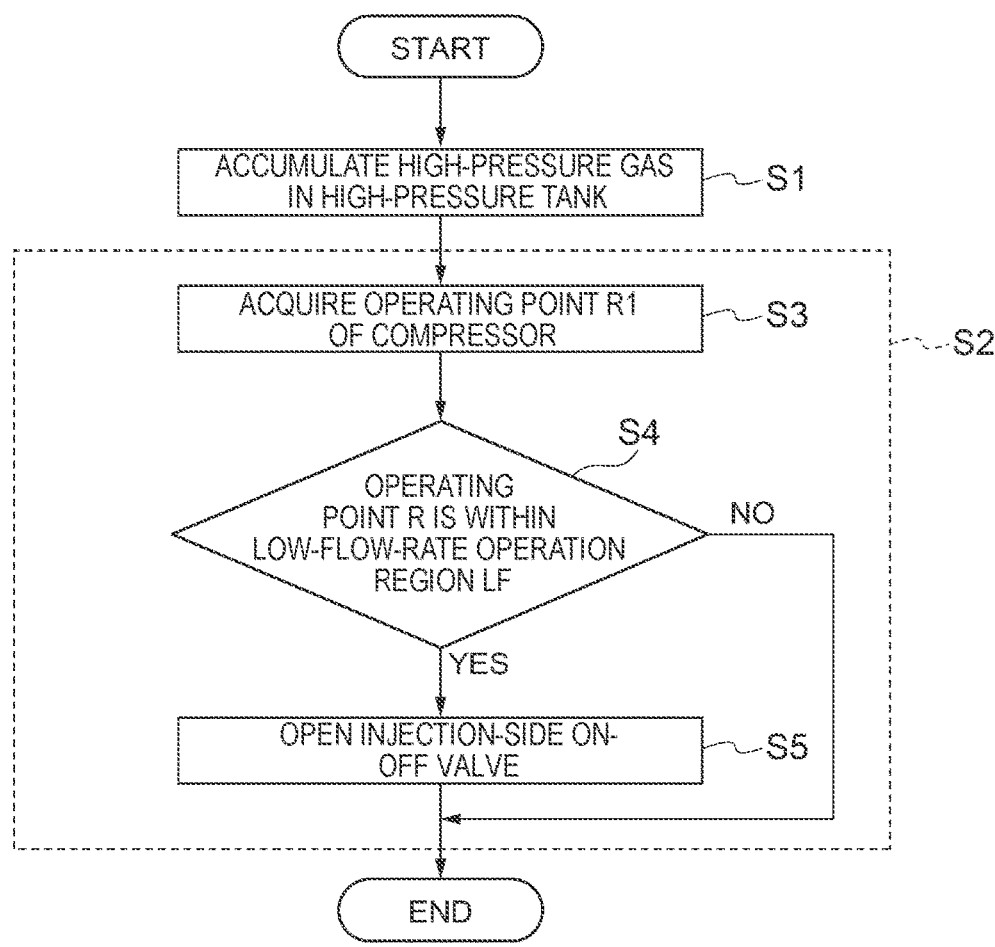
FIG. 7 is a flowchart of a surge suppression method according to an embodiment.

FIG. 7 is a flowchart of a surge suppression method according to an embodiment.

A surge suppression method 200 according to some embodiments is a surge suppression method using the surge suppression device 4 that suppresses surge in the exhaust turbine-type turbocharger 1. The surge suppression device 4 includes the high-pressure tank 5, the high-pressure gas injection line 6, and the injection-side on-off valve 7. As illustrated in FIG. 7, the surge suppression method 200 includes step S1 for accumulating high-pressure gas in the high-pressure tank 5 and step S2 for controlling the injection-side on-off valve 7 on the basis of the relationship between the pressure ratio and the intake flow rate in the compressor 31 of the turbocharger body 3.

In the illustrated embodiment, step S2 includes steps S3 to S5, as illustrated in FIG. 7.

In step S3, the operating point R1 of the compressor 31 is acquired. The operation point R1 may be acquired by the operation point acquisition device 18 and the operation point acquisition unit 101 of the control device 10, or may be acquired by another method.

In step S4, it is determined whether the operation point R1 is located within the low-flow-rate operation region LF of the compressor map M. The determination may be performed by the determination unit 102 of the control device 10 or may be performed manually. If the operating point R1 is not located within the low-flow-rate operation region LF ("NO" in step S4), the flow ends.

When the operation point R1 is located within the low-flow-rate operation region LF ("YES" in step S4), the injection-side on-off valve 7 is open (step S5). The opening operation of the injection-side on-off valve 7 may be performed by the injection-side on-off valve 7 that has received a signal from the opening/closing instruction unit 103 of the control device 10, or may be performed manually.

According to the method, the surge suppression method 200 includes step S2 for controlling the injection-side on-off valve 7 on the basis of the relationship between the pressure ratio and the intake flow rate in the compressor 31. Thus, it is possible to instruct the injection-side on-off valve 7 to open in an operation region (low-flow-rate operation region LF) where surge is likely to occur in the relationship. When the injection-side on-off valve 7 that opens and closes the high-pressure gas injection line 6 is open, the high-pressure gas accumulated in the high-pressure tank 5 flows into the upstream intake passage 12A and is induced to flow in the negative pressure region N formed in the vicinity of the shroud portion 37 and flows toward the downstream side in the axial direction toward the negative pressure region N. Therefore, the flow rate component toward the downstream side in the axial direction, of the flow on the downstream side of the upstream intake passage 12A in relation to the inlet port 61 can be increased. In step S2, by increasing the flow rate component of the flow F near the inlet of the compressor 31 toward the downstream side in the axial direction, it is possible to prevent the flow F from being separated from the impeller blade 36 and the shroud portion 37, and thus, to suppress the occurrence of surge. Therefore, the surge suppression method 200 can widen the operating range of the compressor 31 in the low flow rate range.

According to the method, since the surge suppression method 200 includes step S1 for accumulating the high-pressure gas in the high-pressure tank 5, the high pressure can flow into the upstream intake passage 12A at an intended timing regardless of the operating state of the engine 11 and the turbocharger body 3. By controlling the opening and closing of the injection-side on-off valve 7, a required amount of high-pressure gas can flow into the upstream side intake passage 12A. Therefore, according to the method, it is possible to stably suppress the occurrence of surge as compared with the case where the high-pressure tank 5 is not provided.

The present invention is not limited to the above-described embodiments but includes modifications of the above-described embodiments and appropriate combinations of these modifications. For example, the turbocharger 1 may include both the bypass passage 16 and the EGR gas passage 19, and the high-pressure gas intake line 8 may include both the exhaust gas intake line 8A and the EGR gas intake line 8B.

REFERENCE SIGNS LIST

1 Turbocharger
3 Turbocharger body
4 Surge suppression device
5 High-pressure tank
6 High-pressure gas injection line
7 Injection-side on-off valve
8 High-pressure gas intake line
8A Exhaust gas intake line
8B EGR gas intake line
8C Blow-by gas intake line
8D Combustion gas intake line
8E Compressed air injection line
9, 9A to 9E Intake-side on-off valve
10 Control device
11 Engine
12 Intake passage
12A Upstream intake passage 12B Downstream intake passage
13 Exhaust passage
13A Upstream exhaust passage
13B Downstream exhaust passage
14 Air cleaner
15 Air cooler
16 Bypass passage
16A Downstream bypass passage
17 Waste gate valve
18 Operating point acquisition device
18A Inlet pressure sensor
18B Outlet pressure sensor
18C Flow rate sensor
18D Rotation speed sensor
18E Temperature sensor
19 EGR gas passage
20 EGR gas valve
21 Exhaust gas desulfurization device
22 Electric compressor
23 Gas tank
24 Gas injection line
31 Compressor
32 Turbine
33 Rotating shaft
34 Casing
35 Impeller
36 Impeller blade
37 Shroud portion
61 Inlet port
62 Nozzle portion
63 Flange portion
101 Operation point acquisition unit
102 Determination unit
103 Opening/closing instruction unit
104 Storage unit
111 Pressure accumulation unit
121, 122, 132 Meeting portion
123, 131, 133, 161, 191 Branch portion
200 Surge suppression method
341 Tubular portion
342 Outer peripheral surface
343 Counterbore
344 Through-hole
A, B Component
C Direction
F Flow
L1 Surge line
L2 Engine operating line
LF Low-flow-rate operation region
LM Low-flow-rate-side margin
M Compressor map
N Negative pressure region
P Meeting point
PF Pressure ratio
PI Inlet pressure
PO Outlet pressure
R Rotating direction
R1 Operating point
RN Normal operation region
RS Surge operation region
S1, S2, S3, S4, S5 Step
W Intake flow rate

The invention claimed is:

1. A surge suppression device for suppressing surge in an exhaust turbine-type turbocharger, comprising:
    a high-pressure tank configured to store high-pressure gas with a higher pressure than atmospheric pressure;
    a high-pressure gas injection line connecting the high-pressure tank and an upstream intake passage on an upstream side of a compressor of the turbocharger;
    an on-off valve configured to open and close the high-pressure gas injection line;
    a control device configured to control the on-off valve on the basis of a relationship between a pressure ratio of the compressor of the turbocharger and an intake flow rate; and
    an operating point acquisition device including at least one sensor configured to acquire information about an operating point of the compressor, the operating point defined by the pressure ratio and the intake flow rate,
    wherein the control device includes:
        an operating point acquisition unit configured to acquire the operating point from the information about the operating point acquired by the operating point acquisition device;
        a determination unit configured to determine whether the operating point acquired by the operating point acquisition unit is located within a low-flow-rate operation region, the low-flow-rate operation region being an operating region where surge is likely to occur; and
        an opening/closing instruction unit configured to instruct the on-off valve to open when the determination unit determines that the operating point is located within the low-flow-rate operation region.

2. The surge suppression device according to claim 1, further comprising:
    an exhaust gas intake line connecting the high-pressure tank and a downstream bypass passage on a downstream side of a waste gate valve provided in a bypass passage that connects an upstream exhaust passage on an upstream side of a turbine of the turbocharger and a downstream exhaust passage on a downstream side of the turbine.

3. The surge suppression device according to claim 1, further comprising:
    an EGR gas intake line connecting the high-pressure tank and an EGR gas passage that connects a downstream exhaust passage on a downstream side of a turbine of the turbocharger and the upstream intake passage.

4. The surge suppression device according to claim 1, further comprising:
    a blow-by gas intake line configured to send blow-by gas discharged from an engine to the high-pressure tank.

5. The surge suppression device according to claim 1, further comprising:
    a combustion gas intake line connecting the high-pressure tank and a downstream intake passage on a downstream side of the compressor.

6. The surge suppression device according to claim 1, further comprising:
    an electric compressor configured to pump the high-pressure gas toward the high-pressure tank.

7. The surge suppression device according to claim 1, wherein
    the high-pressure gas injection line includes at least one inlet port configured to inject the high-pressure gas into the upstream intake passage in a direction in which the high-pressure gas has a component directed toward a downstream side in an axial direction of the compressor at a meeting point of the high-pressure gas flowing through the high-pressure gas injection line and the combustion gas flowing through the upstream intake passage.

8. The surge suppression device according to claim 1, wherein
the high-pressure gas injection line includes at least one inlet port configured to inject the high-pressure gas into the upstream intake passage in a direction in which the high-pressure gas has a component directed toward a downstream side in a rotating direction of the compressor at a meeting point of the high-pressure gas flowing through the high-pressure gas injection line and the combustion gas flowing through the upstream intake passage.

9. An exhaust turbine-type turbocharger comprising the surge suppression device according to claim 1.

10. A surge suppression method using a surge suppression device that suppresses surge in an exhaust turbine-type turbocharger, the surge suppression device including:
  a high-pressure tank configured to store high-pressure gas with a higher pressure than atmospheric pressure;
  a high-pressure gas injection line connecting the high-pressure tank and an upstream intake passage on an upstream side of a compressor of the turbocharger;
  an on-off valve configured to open and close the high-pressure gas injection line; and
  an operating point acquisition device including at least one sensor configured to acquire information about an operating point of the compressor, the operating point defined by a pressure ratio of the compressor and an intake flow rate, the surge suppression method comprising a step of:
  a storing step of storing the high-pressure gas in the high-pressure tank;
  an acquiring step of acquiring the operating point from the information about the operating point acquired by the operating point acquisition device;
  a determining step of determining whether the operating point acquired by the acquiring step is located within a low-flow-rate operation region, the low-flow-rate operation region being an operating region where surge is likely to occur; and
  an instructing step of instructing the on-off valve to open when the determining step determines that the operating point is located within the low-flow-rate operation region.

* * * * *